(12) United States Patent
Wang et al.

(10) Patent No.: US 7,750,092 B2
(45) Date of Patent: Jul. 6, 2010

(54) NONAQUEOUS ELECTROLYTE HAVING MALEIMIDE ADDITIVES AND SECONDARY CELLS EMPLOYING THE SAME

(75) Inventors: Tsung-Hsiung Wang, Taichung County (TW); Jing-Pin Pan, Hsinchu Hsien (TW); Shur-Fen Liu, Hsinchu County (TW); Yueh-Wei Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 71 days.

(21) Appl. No.: 11/964,764

(22) Filed: Dec. 27, 2007

(65) Prior Publication Data

US 2008/0157021 A1    Jul. 3, 2008

(30) Foreign Application Priority Data

Dec. 29, 2006    (TW) .............................. 95149879 A

(51) Int. Cl.
    *C08G 73/10*    (2006.01)
(52) U.S. Cl. ...................... 525/422; 525/404; 525/451; 528/322; 528/367; 252/62.2
(58) Field of Classification Search ................ 525/410, 525/422; 252/62.2; 528/367, 322
    See application file for complete search history.

(56) References Cited

U.S. PATENT DOCUMENTS

| | | | | |
|---|---|---|---|---|
| 5,268,432 A | * | 12/1993 | Pan et al. | 525/422 |
| 5,326,794 A | * | 7/1994 | Pan et al. | 523/454 |
| 5,372,891 A | * | 12/1994 | Yu et al. | 428/458 |
| 5,518,779 A | * | 5/1996 | Yu et al. | 427/508 |
| 5,602,213 A | * | 2/1997 | Hsu et al. | 525/454 |
| 6,117,951 A | * | 9/2000 | Liu et al. | 525/426 |
| 6,359,039 B1 | * | 3/2002 | Chen et al. | 523/454 |
| 6,432,613 B1 | * | 8/2002 | Chen et al. | 430/280.1 |
| 6,780,943 B2 | * | 8/2004 | Liu et al. | 525/502 |
| 7,560,194 B2 | * | 7/2009 | Lin et al. | 429/303 |
| 2003/0144430 A1 | * | 7/2003 | Liu et al. | 525/529 |
| 2007/0141461 A1 | * | 6/2007 | Lin et al. | 429/189 |
| 2008/0146706 A1 | * | 6/2008 | Tseng et al. | 524/101 |

FOREIGN PATENT DOCUMENTS

TW    I251361    3/2006

OTHER PUBLICATIONS

Pan, J.P.; Shiau, G.Y.; Lin, S.S.; Chen, K.M.; J. Appl. Polym. Sci., 1992, vol. 45, p. 103-109.*
Wang, F.M.; Wu, H.C.; Cheng, C.S.; Huang, C.L.; Yang, C.R.; Electrochimica Acta, 2009, vol. 54, p. 3788-3793.*
English abstract of TW I251361, pub.Mar. 11, 2006.

* cited by examiner

*Primary Examiner*—David Wu
*Assistant Examiner*—Robert Jones, Jr.
(74) *Attorney, Agent, or Firm*—Thomas, Kayden, Horstemeyer & Risley

(57) ABSTRACT

A composition having a bismaleimide oligomer and preparation methods thereof are provided. The composition having a bismaleimide oligomer comprises a bismaleimide oligomer, wherein the bismaleimide oligomer is in an amount of more than 75 parts by weight, based on 100 parts by weight of the composition. Specifically, the bismaleimide oligomer is prepared by reacting bismaleimide monomers with batch-added barbituric acid.

13 Claims, 6 Drawing Sheets

NONAQUEOUS ELECTROLYTE HAVING MALEIMIDE ADDITIVES AND SECONDARY CELLS EMPLOYING THE SAME

BACKGROUND OF THE INVENTION

1. Field of the Invention

The invention relates to a composition having a bismaleimide oligomer, and more particularly to a composition having high-pure bismaleimide oligomer without purification.

2. Description of the Related Art

Bismaleimide is widely used in fabrication of circuit boards, as an adhesive, copper clad laminates, or resin coated coppers, due to a high glass transition temperature, thermostability, mechanical strength, toughness, and superior physics and electrical characteristics. Bismaleimide polymer obtained by hardening, however, has a high density network structure and exhibits increased brittleness, high moisture absorbability, bad adhesion, and low solubility, resulting in limited applicability.

To overcome the aforementioned drawbacks of the maleimide resin composition, various proposals have been made.

U.S. Pat. No. 5,041,519, the content thereof is incorporated herein by reference, discloses an improved epoxy resin composition which exhibits high glass transition temperature and good toughness. The epoxy resin composition disclosed in the '519 patent comprises a specific epoxy resin, a bismaleimide resin, and barbituric acid. While the epoxy composition of the '519 patent provided several improved physical and electrical properties, it was designed to be used as a substrate in IC packaging, and cannot be used, and was not expected to be used, as an adhesive.

U.S. Pat. No. 5,112,924 discloses a thermosetting composition comprising a multifunctional maleimide and a terminally unsaturated polyamide, polyimide, or polyamideimide oligomer which is soluble in the thermosetting composition. However, with this method, the glass transition temperature and toughness are somewhat reduced, and cost and reaction complexity are substantially increased, thereby limiting application range.

U.S. Pat. No. 5,326,794 discloses a process for manufacturing a high glass transition temperature printed circuit board comprising blending a modified bismaleimide resin into a modified epoxy resin. The material is manufactured by blending a bismaleimide resin reacted with barbituric acid and its derivative thereof and an epoxy resin with an oxazolidone ring resulting from the reaction of a polyisocyanate and an epoxy resin modified with a secondary diamine and followed by curing. The resultant product has a high glass transition temperature, good adhesion, flame retardancy, and low bromine content. However, the bismaleimide and epoxy resin must be modified before blending, resulting in an increase in cost and time. Further, the obtained, so-called, 'improved', product characteristics are not very obvious.

Commercially available bismaleimide thermoset compositions are noted for their high modulus, and excellent resistance to thermal degradation. However, the thermoset compositions are also well known for brittleness. The utility of the bismaleimide class of thermosets would be vastly improved, if brittle formulations could be lessened while retaining desirable thermal and elastic properties.

BRIEF SUMMARY OF THE INVENTION

A composition having a bismaleimide oligomer is provided. The composition having a bismaleimide oligomer comprises a bismaleimide oligomer, wherein the bismaleimide oligomer is in an amount of more than 75 parts by weight, based on 100 parts by weight of the composition. Specifically, the bismaleimide oligomer is prepared by reacting bismaleimide monomers with batch-added barbituric acid.

According an embodiment of the invention, a method for preparing a composition having a bismaleimide oligomer is also provided. The method comprises providing a bismaleimide monomer dissolved in a solvent to prepare a solution; and adding a multi-batch of barbituric acid into the solution to react with the bismaleimide monomer, wherein, for each batch, the molar ratio of the barbituric acid to the bismaleimide monomer is less than 0.2.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
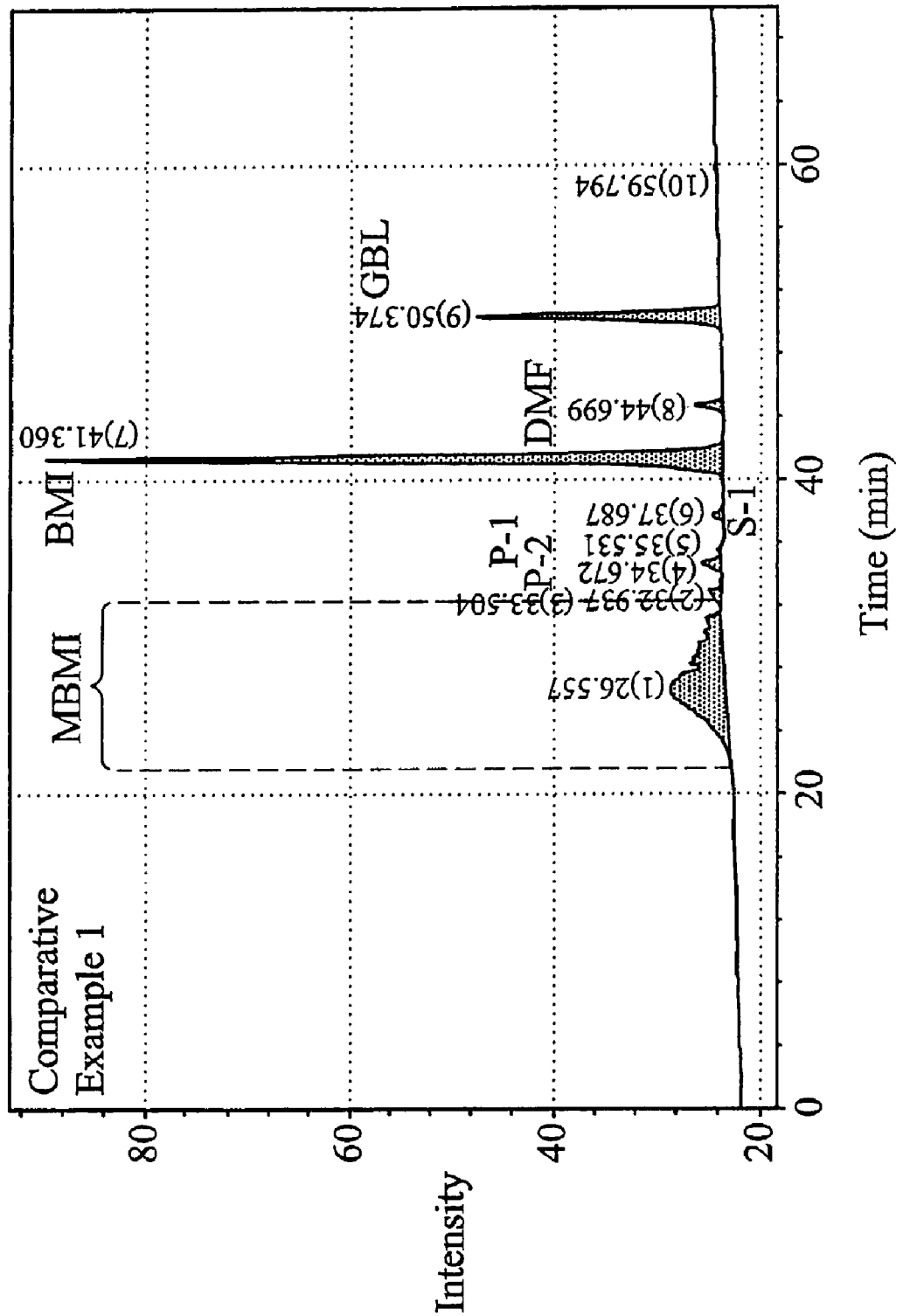
FIGS. 1-6 respectively show the GPC spectrum of the bismaleimide oligomers prepared in Comparative Examples 1-2 and Examples 1-4.

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide a composition having a bismaleimide oligomer, wherein the bismaleimide oligomer is in an amount of more than 75 parts by weight, based on 100 parts by weight of the composition. Due to the high-pure content of bismaleimide oligomer, the composition employing the same is purification-free and can be widely applied in electrical devices, displays, solar cells, sensors, optoelectronic materials, electrolytes, isolation membranes, electrodes, or multi-functional composite materials.

The composition of the invention has high-pure bismaleimide oligomer, wherein the bismaleimide oligomer with a hyper branch architecture exhibits high solubility to solvent and high compatibility for resin. Further, the invention also provides a method for preparing the aforementioned composition, shown as follows.

A bismaleimide monomer is dissolved in a solvent. Next, a multi-batch of barbituric acid is added to the solvent containing the bismaleimide monomer. For each batch, the molar ratio of the barbituric acid to the bismaleimide monomer is less than 0.2. In an embodiment, the barbituric acid or its derivative is added to the reactable solvent system containing the bismaleimide monomer or its derivative by using two or more batches to perform heating polymerization; in efforts to avoid overreaction and formation of gelation or network polymerization should only one batch be performed.

The conditions for the preparation of the bismaleimide oligomer are described as follows. The molar ratio of the total barbituric acid and the bismaleimide monomer is about 1:3~2:1 or 1:2~1:1. The barbituric acid or its derivative is added to the reactable solvent system containing the bismaleimide monomer or its derivative using the multi-batch to perform the heating polymerization. The amount of addition may be the same or different. The batch number may be 2~30 or 4~16. The addition time may be 5 min~6 hr or 15 min~2 hr for each batch. The temperature of the heating polymerization may be 100~150° C. or 120~140° C. The reaction time means the continuous reaction time after addition of the barbituric acid or its derivative, and may be 0.5~12 hr or 1~6 hr.

A high-polarity solvent, for example, γ-butyrolactone, propylene carbonate or N-methyl pyrrolidone, may facilitate the polymerization of the bismaleimide and the barbituric acid. Of which, the solid content thereof, would be altered.

The bismaleimide monomer can have formulae (I) and (II):

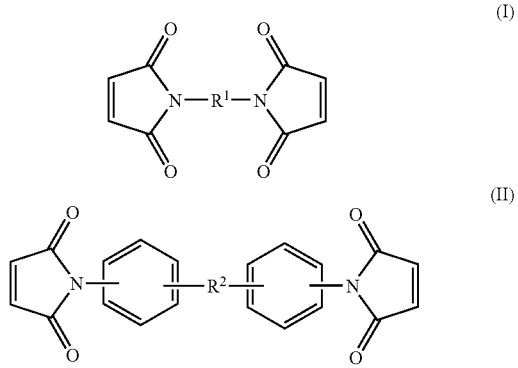

In the formulae, $R^1$ may comprise —$RCH_2$—(alkyl), —$RNH_2R$—, —$C(O)CH_2$—, —$CH_2OCH_2$—, —$C(O)$—, —O—, —O—O—, —S—, —S—S—, —$S(O)$—, —$CH_2S$ (O)$CH_2$—, —(O)S(O)—, —$C_6H_4$—, —$CH_2(C_6H_4)CH_2$—, —$CH_2(C_6H_4)(O)$—, phenylene, diphenylene, substituted phenylene or substituted diphenylene, $R^2$ comprises —$RCH_2$—, —C(O)—, —$C(CH_3)_2$—, —O—, —O—O—, —S—, —S—S—, —(O)S(O)— or —S(O)—. R may independently comprise hydrogen or C1~4 alkyl. The bismaleimide monomer may be selected from the group consisting of N,N'-bismaleimide-4,4'-diphenylmethane, [1,1'-(methylenedi-4,1-phenylene)bismaleimide], [N,N'-(1,1'-biphenyl-4,4'-diyl) bismaleimide], [N,N'-(4-methyl-1,3-phenylene)bismaleimide], [1,1'-(3,3'dimethyl-1,1'-biphenyl-4,4'-diyl) bismaleimide], N,N'-ethylenedimaleimide, [N,N'-(1,2-phenylene)dimaleimide], [N,N'-(1,3-phenylene) dimaleimide], N,N'-thiodimaleimide, N,N'-dithiodimaleimide, N,N'-ketonedimaleimide, N,N'-methylene-bis-maleinimide, bis-maleinimidomethyl-ether, [1,2-bis-(maleimido)-1,2-ethandiol], N,N'-4,4'-diphenylether-bis-maleimid and [4,4'-bis(maleimido)-diphenylsulfone].

The barbituric acid has formula (III):

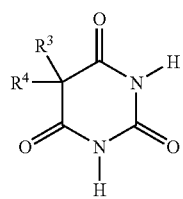

In formula (III), $R^3$ and $R^4$ may be the same or different and comprise H, $CH_3$, $C_2H_5$, $C_6H_5$, $CH(CH_3)_2$, $CH_2CH(CH_3)_2$, $CH_2CH_2CH(CH_3)_2$ or

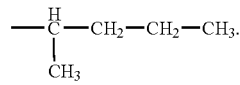

The bismaleimide oligomer is a multi-function bismaleimide oligomer with a hyper branch architecture or multi double-bond reactive functional groups. In the hyper branch architecture, the bismaleimide serves as an architecture matrix. The radical barbituric acid is grafted to the bismaleimide's double bond to begin branching and ordering to form the hyper branch architecture. The high-purity multi-function bismaleimide oligomer is prepared by adjustment of, for example, the concentration ratio, the chemical order addition procedure, the reaction temperature, the reaction time, the environmental condition, the branching degree, the polymerization degree, the structural configuration and the molecular weight. The branch architecture is [(bismaleimide monomer)-(barbituric acid)x]m, wherein x is 0~4 and m (repeating unit) is less than 20. In an embodiment, x may be 0.5~2.5 and m (repeating unit) may be 2~10. Additionally, each branch may be further branched. Thus, the total branch architecture is {[(bismaleimide monomer)-(barbituric acid)x]m}n, wherein x is 0~4 or 0.5~2.5, m (repeating unit) is less than 20 or 2~20, and n (repeating unit) is less than 50 or 5~20.

The electron-deficient unsaturated double bonds at the two ends of the bismaleimide monomer are active to be polymerized due to the adjacent electron-withdrawing carbonyl groups. When sufficient energy (heating or irradiation) is provided, the alkyl of the barbituric acid or its derivative dissolved in solvent is uniformly broken down to form an alkyl radical having an unpaired electron, serving as a free radical initiator to attack the double bonds.

A key feature of the invention, is that after reaction with barbituric acid, the bismaleimide monomer is nearly consumed to produce the bismaleimide oligomer. The weight ratio between the obtained bismaleimide oligomer and the remaining bismaleimide monomer is larger than 80:20. Further, the total obtained bismaleimide oligomer and the remaining bismaleimide monomer are in an amount of more than 90 parts by weight, based on 100 parts by weight of the obtained composition.

In some embodiment of the invention, the bismaleimide oligomer can further react with epoxies, polyimides, or acrylates to obtain a molecular composite, exhibiting superior properties and widely used in applications of electric devices, displays, solar cells, sensors, optoelectronic materials, electrolytes, isolation membranes, electrodes, or multi-functional composite materials.

The following description is of the best-contemplated mode of carrying out the invention. This description is made for the purpose of illustrating the general principles of the invention and should not be taken in a limiting sense. The scope of the invention is best determined by reference to the appended claims.

In the following Comparative Examples and Examples, the bismaleimide monomer comprised 4,4'-Bismaleimidodi-phenylmethane sold and manufacture from Tokyo Chemical Industry Co., LTD; The Barbituric Acid was sold and manufacture from Merck LTD; and γ-butyrolactone, propylene carbonate, and N-methyl pyrollidone were sold and manufacture from Tokyo Chemical Industry Co., LTD And Merck LTD. Further, all compounds were anticipatively dehydrated by means of heating and vacuum.

Conventional One-Pot Synthesis of Bismaleimide Oligomer

Comparative Example 1

19.2765 g 1,1-methylenedi-4,1-phenylene bismaleimide monomer particles or powder and 80 g γ-butyrolactone were mixed in a 250 mL round-bottomed three-necked flask and heated to 130° C. with stirring until the bismaleimide monomer was completely dissolved. Next, 0.7152 g barbituric acid powder was completely added to the 130° C. bismaleimide/γ-butyrolactone solution and stirred to perform bismaleimide polymerization. After addition of the barbituric acid, the polymerization continuously proceeded for 6 hr to form bismaleimide oligomer. The mole concentration ratio of the bismaleimide and barbituric acid was 10:1.

Comparative Example 2

18.6668 g 1,1-methylenedi-4,1-phenylene bismaleimide monomer particles or powder and 80 g γ-butyrolactone were mixed in a 250 mL round-bottomed three-necked flask and heated to 130° C. with stirring until the bismaleimide monomer was completely dissolved. Next, 1.3341 g barbituric acid powder was completely added to the 130° C. bismaleimide/γ-butyrolactone solution and stirred to perform bismaleimide polymerization. After addition of the barbituric acid, the polymerization continuously proceeded for 6 hr to form bismaleimide oligomer. The mole concentration ratio of the bismaleimide and barbituric acid was 5:1.

Comparative Example 3

17.8712 g 1,1-methylenedi-4,1-phenylene bismaleimide monomer particles or powder and 80 g γ-butyrolactone were mixed in a 250 mL round-bottomed three-necked flask and heated to 130° C. with stirring until the bismaleimide monomer was completely dissolved. Next, 2.1298 g barbituric acid powder was completely added to the 130° C. bismaleimide/γ-butyrolactone solution and stirred to perform bismaleimide polymerization. After addition of the barbituric acid, the polymerization continuously proceeded for 6 hr to form bismaleimide oligomer. The mole concentration ratio of the bismaleimide and barbituric acid was 3:1.

Comparative Example 4

17.8712 g 1,1-methylenedi-4,1-phenylene bismaleimide monomer particles or powder and 80 g γ-butyrolactone were mixed in a 250 mL round-bottomed three-necked flask and heated to 130° C. with stirring until the bismaleimide monomer was completely dissolved. Next, 6.9090 g barbituric acid powder was completely added to the 130° C. bismaleimide/γ-butyrolactone solution and stirred to perform bismaleimide polymerization. After addition of the barbituric acid, the polymerization continuously proceeded for 6 hr to form bismaleimide oligomer. The mole concentration ratio of the bismaleimide and barbituric acid was 1:1. Since the 6.9090 g barbituric acid powder was added into the flask at one time, a gelation phenomenon was observed.

Bismaleimide Oligomer Preparation Via Batch-Additions of Barbituric Acid

Example 1

20.0002 g 1,1-methylenedi-4,1-phenylene bismaleimide monomer particles or powder and 94.3022 g γ-butyrolactone were mixed in a 250 mL round-bottomed three-necked flask and heated to 130° C. with stirring until the bismaleimide monomer was completely dissolved. Next, 3.5752 g barbituric acid powder was progressively added to the 130° C. bismaleimide/γ-butyrolactone solution with 8 batches (30-min interval) and stirred to perform bismaleimide polymerization. After addition of the barbituric acid batches were completed, the polymerization continuously proceeded for 6 hr to form bismaleimide oligomer. The mole concentration ratio of the bismaleimide and barbituric acid was 2:1.

Example 2

19.9995 g 1,1-methylenedi-4,1-phenylene bismaleimide monomer particles or powder and 108.6008 g γ-butyrolactone were mixed in a 250 mL round-bottomed three-necked flask and heated to 130° C. with stirring until the bismaleimide monomer was completely dissolved. Next, 7.1483 g barbituric acid powder was progressively added to the 130° C. bismaleimide/γ-butyrolactone solution with 16 batches (15-min interval) and stirred to perform bismaleimide polymerization. After addition of the barbituric acid batches were completed, the polymerization continuously proceeded for 6 hr to form bismaleimide oligomer. The mole concentration ratio of the bismaleimide and barbituric acid was 1:1.

Example 3

19.9991 g 1,1-methylenedi-4,1-phenylene bismaleimide monomer particles or powder and 94.2997 g propylene carbonate were mixed in a 250 mL round-bottomed three-necked flask and heated to 130° C. with stirring until the bismaleimide monomer was completely dissolved. Next, 3.57573 g barbituric acid powder was progressively added to the 130° C. bismaleimide/propylene carbonate solution with 4 batches (60-min interval) and stirred to perform bismaleimide polymerization. After addition of the barbituric acid batches were completed, the polymerization continuously proceeded for 6 hr to form bismaleimide oligomer. The mole concentration ratio of the bismaleimide and barbituric acid was 2:1.

Example 4

19.9997 g 1,1-methylenedi-4,1-phenylene bismaleimide monomer particles or powder and 107.6263 g propylene carbonate were mixed in a 250 mL round-bottomed three-necked flask and heated to 130° C. with stirring until the bismaleimide monomer was completely dissolved. Next, 7.1498 g barbituric acid powder was progressively added to the 130° C. bismaleimide/propylene carbonate solution with 8 batches (30-min interval) and stirred to perform bismaleimide polymerization. After addition of the barbituric acid batches were completed, the polymerization continuously proceeded for 6 hr to form bismaleimide oligomer. The mole concentration ratio of the bismaleimide and barbituric acid was 1:1.

Appearance Analysis:

The bismaleimide oligomer prepared in Comparative Examples 1-3 and Examples 1-4 were respectively subjected to appearance analysis, and the results were shown as in Table 1. The bismaleimide oligomer prepared from the conventional one-pot process was colloid when the mole concentration ratio value of the bismaleimide and barbituric acid was less than 3.

TABLE 1

|  | Comparative Example 1 | Comparative Example 2 | Comparative Example 3 | Example 11 | Example 2 | Example 3 | Example 4 |
|---|---|---|---|---|---|---|---|
| colloid | — | — | Yes | — | — | — | — |
| color | yellow brown | brown | tan | brown | brown | brown | brown |
| precipitate | — | — | yes | — | — | — | — |

Measurement of Gel Permeation

The bismaleimide oligomer prepared in Comparative Examples 1-3 and Examples 1-4 were respectively measured by Gel Permeation Chromatography (JASCO PU-880/RI-830; Colomn Oven: COLBOX; Columns: Shodex GPC KDG/KD-801/KD-802/KD-802/KD-8025) with DMF (N-N-Dimethylformamide) as solvent and a Colomn Oven temperature of 40° C. Table 2 shows the base GPC peak information of the barbituric acid, bismaleimide monomer, and solvent.

TABLE 2

|  | Barbituric Acid | 4,4'-Bismaleimidod i-phenylmethane | N-N-Dimethyl form-amide | Propylene Carbonate | γ-Butyrolactone |
|---|---|---|---|---|---|
| acronym | BTA | BMI | DMF | PC | GBL |
| structure | (structure) | (structure) | (structure) | (structure) | (structure) |
| Shape | White powder | Yellow solid | Colorless liquid | Colorless liquid | Colorless liquid |
| MW | 128.09 | 358.35 | 73.10 | 102.09 | 86.09 |
| GPC Peak | 36.13 | 41.269 | 44.439 | 47.657 | 50.170 |

Figure 2:
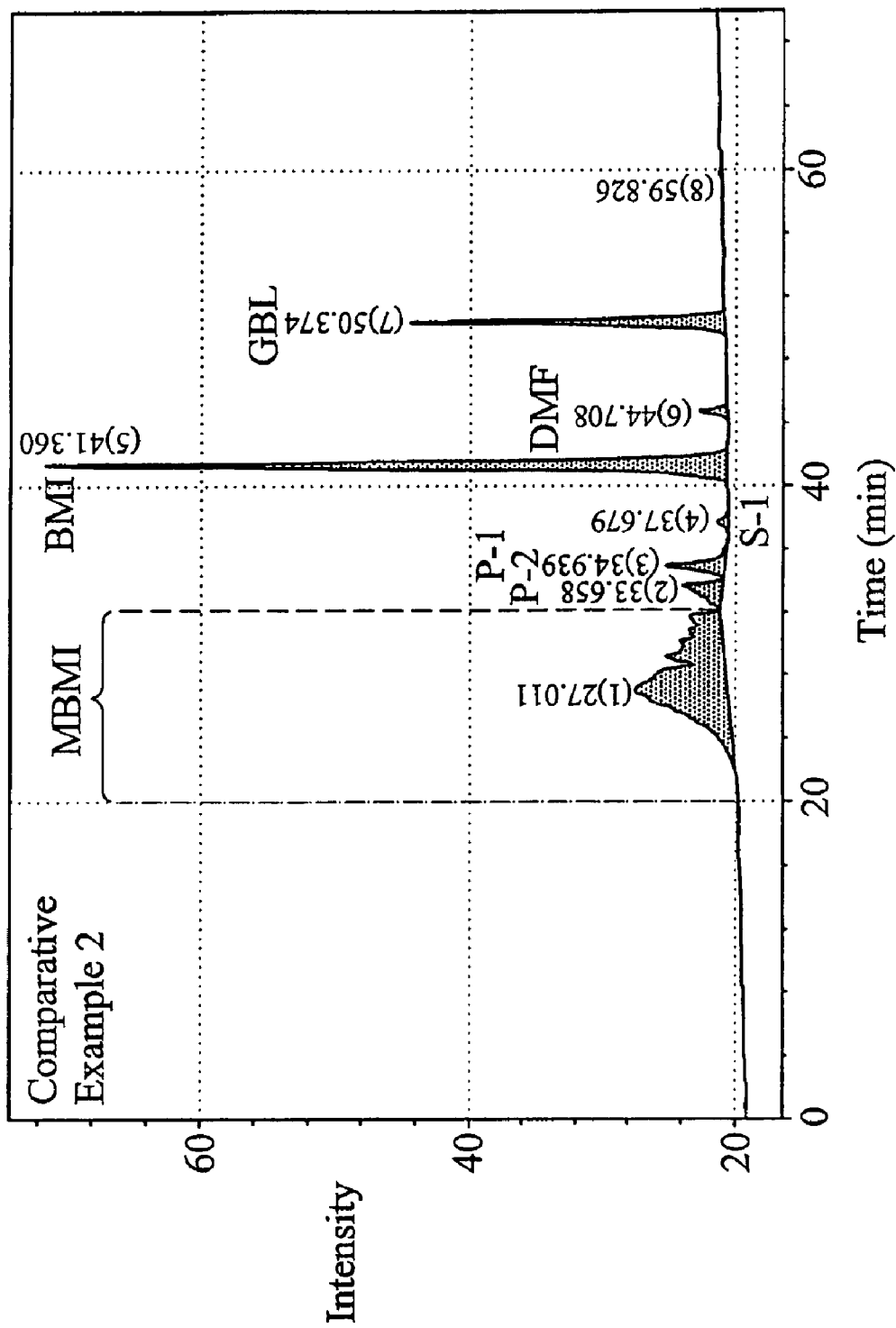
Figure 3:
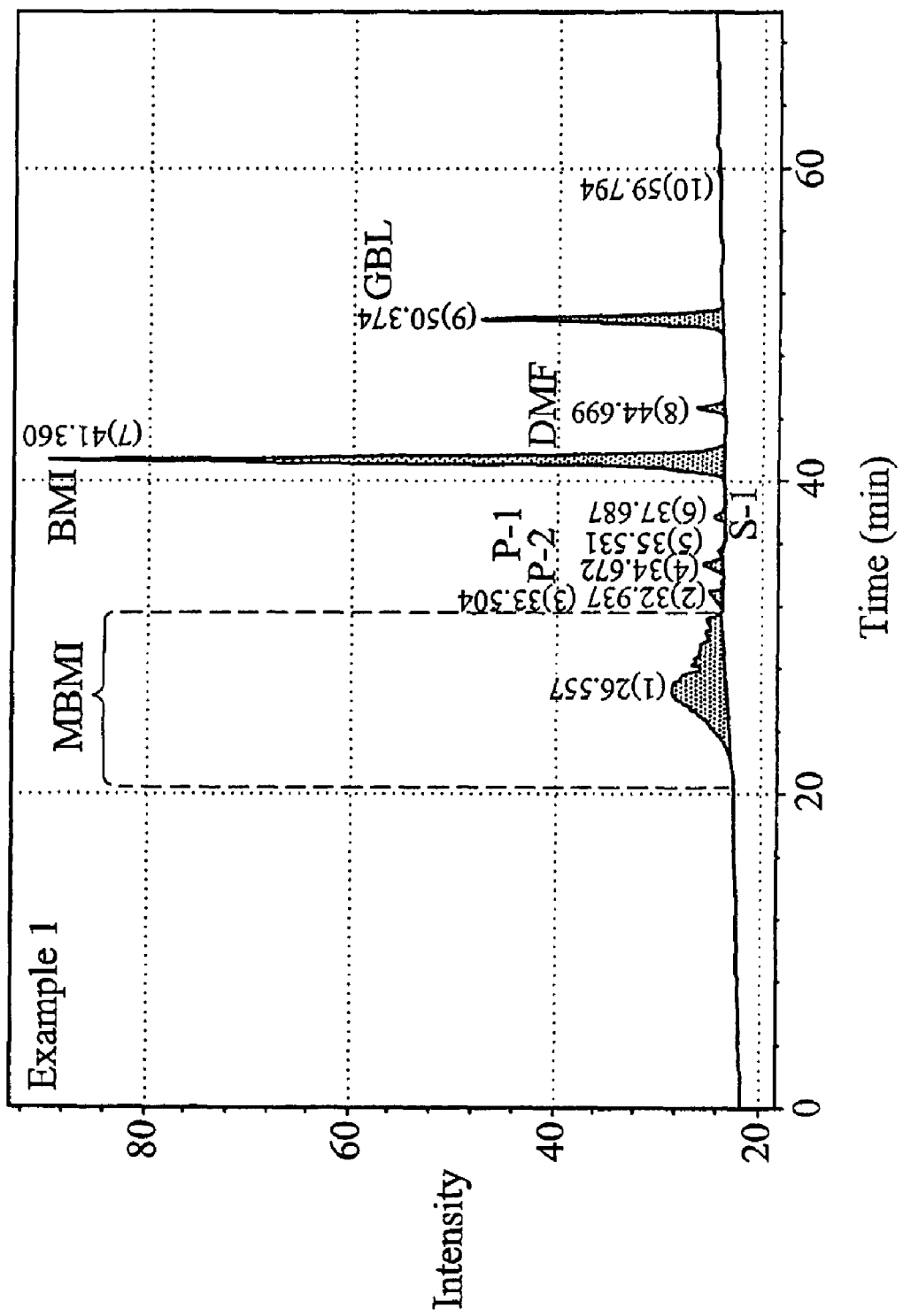
Figure 4:
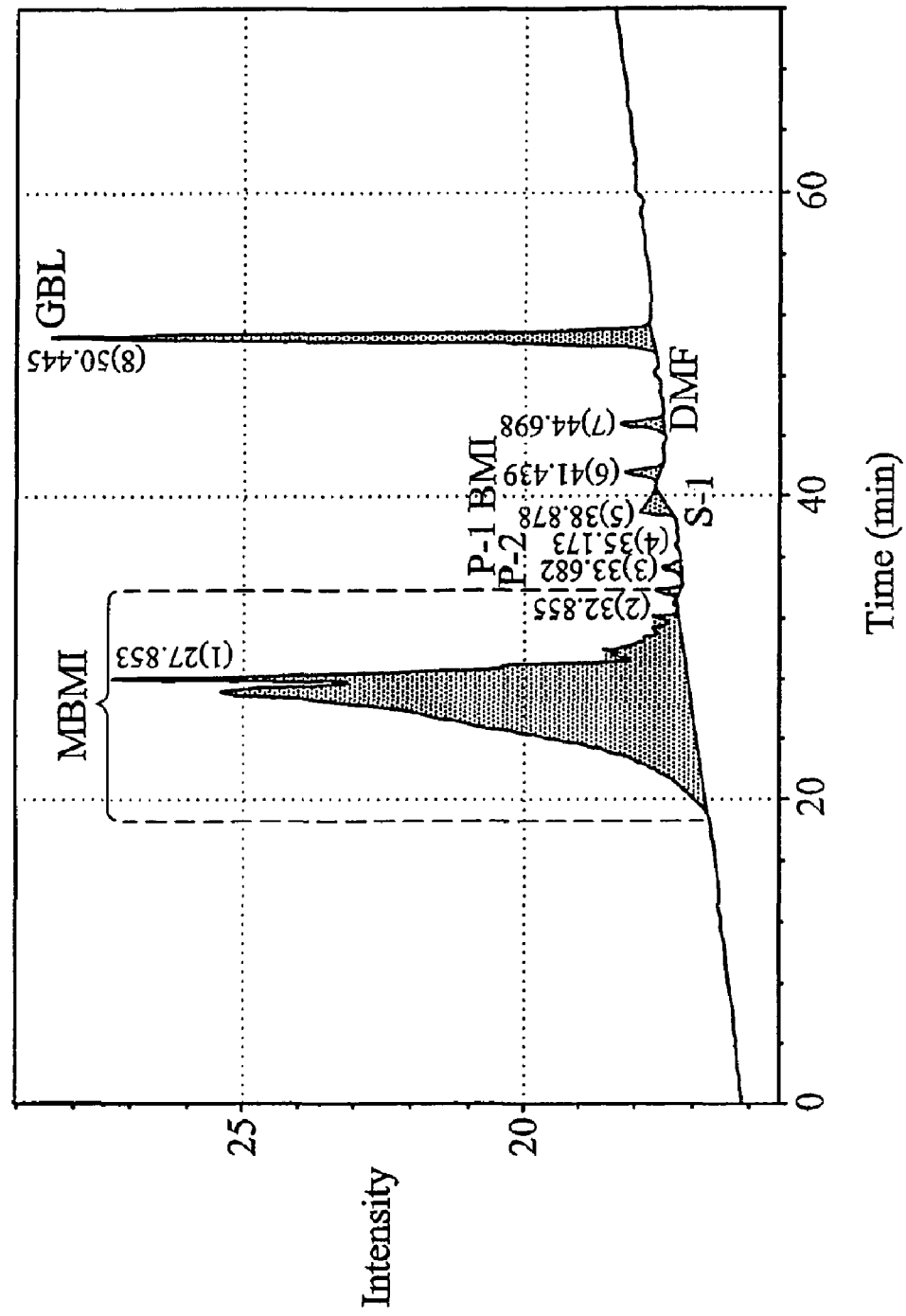
Figure 5:
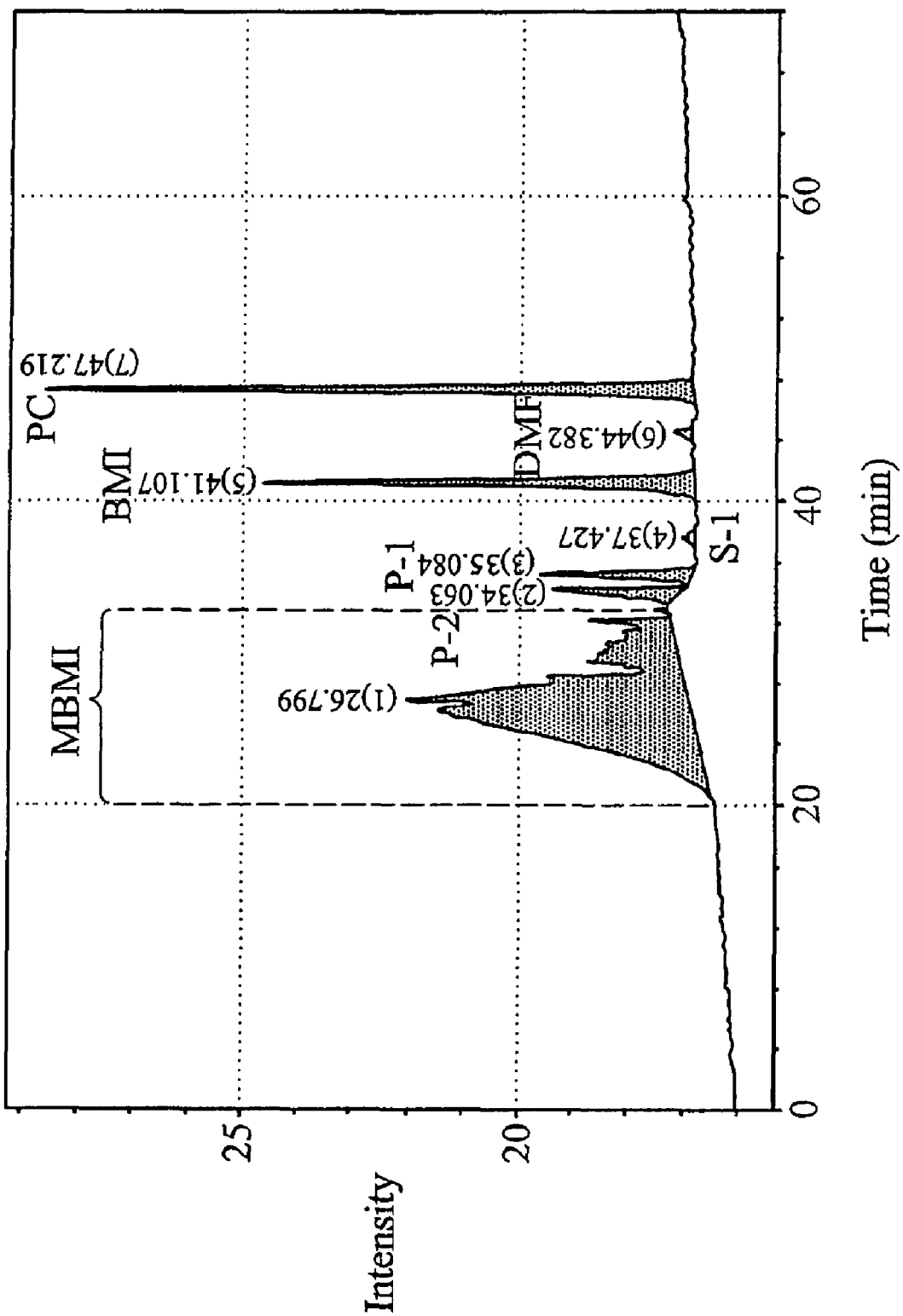
Figure 6:
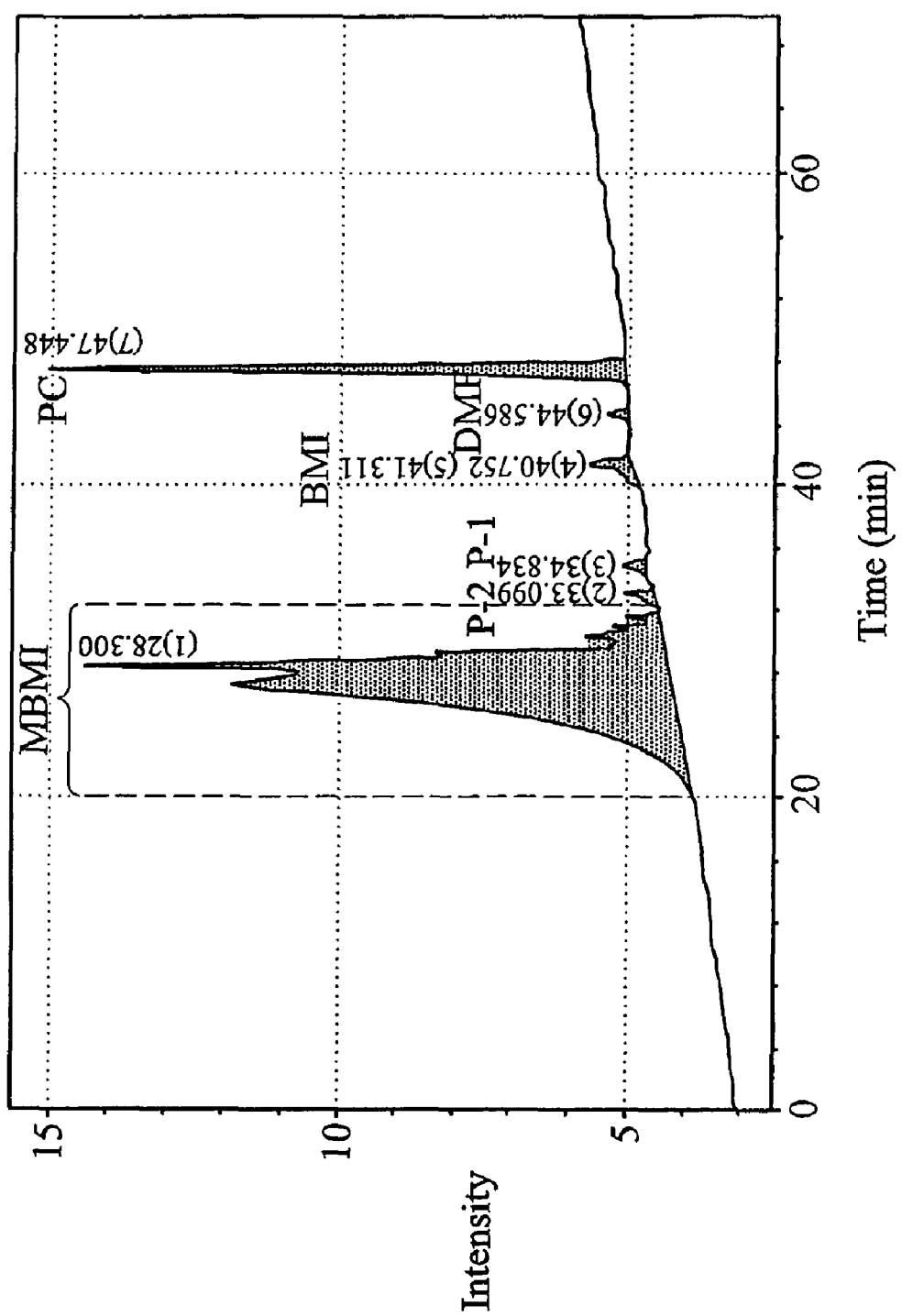

FIGS. 1-6 respectively show the GPC spectrum of the bismaleimide oligomers prepared in Comparative Examples 1-2 and Examples 1-4, and the results were shown as in Table 3.

TABLE 3

| Peak area, % | Comparative Examples 1 | Comparative Examples 2 | Example 1 | Example 2 | Example 3 | Example 4 |
|---|---|---|---|---|---|---|
| GBL | 16.62 | 16.25 | 17.99 | 15.91 | — | — |
| PC | — | — | — | — | 17.04 | 15.96 |
| DMF | 1.67 | 1.40 | 0.58 | 0.94 | 0.40 | 0.50 |
| BMI | 46.87 | 35.98 | 11.54 | 0.80 | 12.09 | 1.69 |

TABLE 3-continued

| Peak area, % | Comparative Examples 1 | Comparative Examples 2 | Example 1 | Example 2 | Example 3 | Example 4 |
|---|---|---|---|---|---|---|
| S-1 | 0.86 | 0.57 | 0.13 | 1.29 | 0.34 | — |
| P-1 | 1.36 | 3.48 | 2.36 | 0.42 | 3.65 | 0.55 |
| P-2 | 1.33 | 3.28 | 3.09 | 0.39 | 3.49 | 0.80 |
| MBMI | 30.94 | 39.02 | 64.31 | 80.23 | 62.99 | 80.43 |
| MBMI/(MBMI + BMI) (%) | 39.76 | 52.03 | 84.79 | 99.01 | 83.90 | 97.94 |
| MBMI + BMI (%) | 93.32 | 89.55 | 92.49 | 96.36 | 90.50 | 97.72 |
| MBMI (%) | 37.10 | 46.59 | 78.41 | 95.14 | 75.93 | 95.70 |

Accordingly, the weight ratio of the bismaleimide oligomers prepared in Comparative Examples 1-2 was less than 50% based on the total weight of crude product. To the contrary, the weight ratio of the bismaleimide oligomers prepared in Examples 1-4 was more than 75%, preferable, based on the total weight of crude product. Further, the weight ratio of the remaining bismaleimide monomer was more than 40%, based on the total weight of the bismaleimide monomer and bismaleimide oligomer.

Note that the crude products (composition) having bismaleimide oligomers prepared and provided by the invention are different from those of U.S. Pat. No. 5,041,519 not only by weight ratio thereof (purity) but also by chemical configuration, molecular weight, and polymer size. In the invention, the polydispersity index, chemical configuration, molecular weight, and polymer size of the bismaleimide oligomers can be modified by adjusting the times of batch, interval, and dosage of barbituric acid addition, thereby materializing the hyper branched architecture. Therefore, the solubility to solvent, compatibility for resin, glass transition temperature, thermostability, mechanical strength, toughness, and physics and electrical characteristics are all enhanced.

The bismaleimide oligomers provided by U.S. Pat. No. 5,112,924 are prepared by blending with polyamide, polyimide, or polyamideimide oligomer for improving the characteristics thereof. In the invention, the characteristics of bismaleimide oligomer are improved resulting from the process conditions (reaction temperature, times of batch, interval, and dosage of barbituric acid addition). Namely, the polyamide, polyimide, or polyamideimide oligomers are not indispensable to the present invention for preparing a composition having bismaleimide oligomers. In the invention, the degree of branching and polymerization of the bismaleimide oligomer are controlled by process conditions. Since no additional components (such as polyamide, polyimide, or polyamideimide oligomer) indispensably needed to join reaction, the cost and reaction complexity are substantially reduced.

Accordingly, the invention provide a composition having a bismaleimide oligomer, wherein the bismaleimide oligomer is in an amount of more than 75 parts by weight, based on 100 parts by weight of the composition. Due to the high-pure content of bismaleimide oligomer, the composition employing the same is purification-free and can be widely applied in electrical devices, displays, solar cells, sensors, optoelectronic materials, electrolytes, isolation membranes, electrodes, or multi-functional composite materials.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A composition having a bismaleimide oligomer, comprising:
   a bismaleimide oligomer, wherein the bismaleimide oligomer is in an amount of more than 75 parts by weight, based on 100 parts by weight of the composition, and the bismaleimide oligomer is prepared by reacting bismaleimide monomers with batch-added barbituric acid.

2. The composition as claimed in claim 1, further comprising:
   bismaleimide monomers.

3. The composition as claimed in claim 1, wherein the bismaleimide oligomer comprises bismaleimide oligomers with a hyper branched architecture or multi double-bond reactive functional groups.

4. The composition as claimed in claim 3, wherein the bismaleimide oligomers with hyper branched architecture comprises bismaleimides serving as an architecture matrix and the barbituric acid grafted to the bismaleimide's double bond to begin branching and ordering to form the hyper branched architecture.

5. The composition as claimed in claim 2, wherein the bismaleimide monomers have formulae (I) and (II):

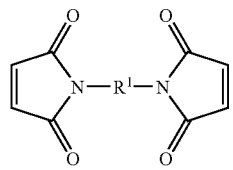

formula (I)

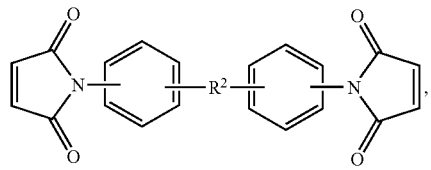

formula (II)

wherein $R^1$ comprises —RCH$_2$—(alkyl), —RNH$_2$R—, —C(O)CH$_2$—, —CH$_2$OCH$_2$—, —C(O)—, —O—, —O—O—, —S—, —S—S—, —S(O)—, —CH$_2$S(O)CH$_2$—, —(O)S(O)—, —C$_6$H$_4$—, —CH$_2$(C$_6$H$_4$)CH$_2$—, —CH$_2$(C$_6$H$_4$)(O)—, phenylene, diphenylene, substituted phenylene or substituted diphenylene, $R^2$ comprises —RCH$_2$—, —C(O)—, —C(CH$_3$)$_2$—, —O—, —O—O—, —S—, —S—S—, —(O)S(O)— or —S(O)—, and R independently comprises hydrogen or C$_{1-4}$ alkyl.

6. The composition as claimed in claim 1, wherein the bismaleimide monomer comprises N,N'-bismaleimide-4,4'-diphenylmethane, 1,1'-(methylenedi-4,1-phenylene)bismaleimide, N,N'-(1,1'-biphenyl-4,4'-diyl) bismaleimide, N,N'-(4-methyl-1,3-phenylene)bismaleimide, 1,1'-(3,3' dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-ketonedimaleimid, N,N'-methylene-bis-maleinimid, bis-maleinimidomethylether, 1,2-bis-(maleimido)-1,2-ethandiol, N,N'-4,4'-diphenylether-bis-maleimid, 4,4'-bis(maleimido)-diphenylsulfone or combinations thereof.

7. The composition as claimed in claim 1, wherein the barbituric acid has formula (III):

formula (III)

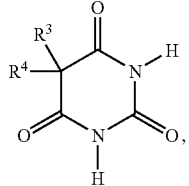

wherein $R^3$ and $R^4$ are the same or different and comprise H, $CH_3$, $C_2H_5$, $C_6H_5$, $CH(CH_3)_2$, $CH_2CH(CH_3)_2$, $CH_2CH_2CH(CH_3)_2$ or

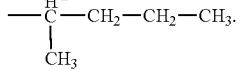

8. The composition as claimed in claim 3, wherein the branch architecture is [(bismaleimide monomer)-(barbituric acid)$_x$]$_m$, wherein x is of between 0~4 and m (repeating unit) is less than 20.

9. The composition as claimed in claim 8, wherein x is of between 0.5~2.5 and m (repeating unit) is l of between 2~10.

10. The composition as claimed in claim 3, wherein the hyper branched architecture is further branched and represented by {[(bismaleimide monomer)-(barbituric acid)x]m}n, wherein x is of between 0~4, m (repeating unit) is less than 20, and n is less than 50.

11. The composition as claimed in claim 1, wherein the composition is a solid.

12. The composition as claimed in claim 1, further comprising a carrier, wherein the composition is a liquid or colloid.

13. The composition as claimed in claim 1, further comprising a molecular composite, wherein the molecular composite is prepared by reacting the bismaleimide oligomer with epoxies, polyimides, or acrylates.

* * * * *